United States Patent

[11] 3,522,830

[72] Inventor: Robert E. Blizard
Hatboro, Pennsylvania
[21] Application No.: 727,754
[22] Filed: May 8, 1968
[45] Patented: Aug. 4, 1970
[73] Assignee: Standard Pressed Steel Co.
Jenkintown, Pennsylvania
a Corp. of Pennsylvania

[54] LOCK NUT
4 Claims, 3 Drawing Figs.

[52] U.S. Cl. .................................................. 151/7
[51] Int. Cl. ................................................. F16b 39/34
[50] Field of Search ....................................... 151/7, 15,
21B, 19; 85/32K; 10/86A; 151/41.76

[56] References Cited
UNITED STATES PATENTS

| | | | |
|---|---|---|---|
| 2,283,850 | 5/1942 | Danforth | 151/7 |
| 2,286,667 | 6/1942 | Brooke | 151/7 |
| 2,333,388 | 11/1943 | Poupitch | 151/7 |
| 2,448,902 | 9/1948 | McKenzie | 151/41.76X |
| 3,289,724 | 12/1966 | Ernest | 151/7 |

Primary Examiner—Ramon S. Britts
Attorneys—Stanley Belsky and Curtis, Morris and Safford

ABSTRACT: A lock nut having an annular locking bushing of a hard, resilient resin with inwardly inclined flats at its periphery engaged by inwardly deformed portions of an outer collar of the metal nut body to lock the bushing against both axial and rotational movement.

Patented Aug. 4, 1970

3,522,830

INVENTOR.
ROBERT E. BLIZARD

BY

Curtis, Morris + Safford
ATTORNEYS

U.S. PATENT 3,522,830
LOCK NUT

This invention relates to a self-locking nut of the type having a resiliently deformable non-metallic insert bushing which frictionally engages the thread surfaces of the mating male fastener element.

It is among the objects of the invention to provide a lock nut wherein the locking bushing is held extremely securely against either rotational or axial movement relative to the nut body.

Another object is that of providing such a lock nut wherein the configurations of both the nut body and the insert bushing are such as to avoid excessive stress concentrations and provide a strong and reliable fastener assembly.

A further object is the provision of such a lock nut wherein the torque required for rotation of the nut relative to mating male fastener element is maintained within desired upper and lower tolerances after a number of reuses and after subjection to a wide range of anticipated environmental conditions, including high and low temperatures, water immersion, etc.

Still another object is that of providing such a lock nut which is simple in design and susceptible of economical manufacture.

In accordance with a preferred embodiment of the present invention, a nut body having an exterior wrenching surface is provided with a raised annular collar. An annular bushing of a hard, resilient, non-metallic material having a pair of opposed, inclined, exterior surfaces is seated within the annular collar adjacent the nut body and the annular collar is deformed adjacent the planar surfaces of the bushing to positively retain the bushing within the collar and prevent rotational or axial displacement of the bushing. When the nut is engaged on a stud member, the bushing provides a self-locking action on the stud.

Figure 1:
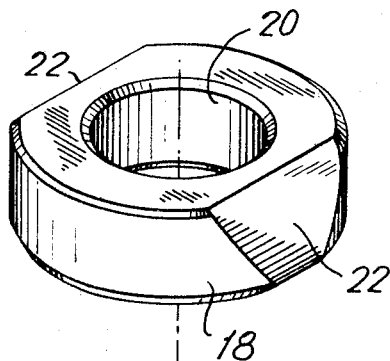
FIGURE 1 is an isometric view of the locking bushing and nut body of a lock nut embodying features of the invention, prior to assembly of these two elements.
Figure 2:
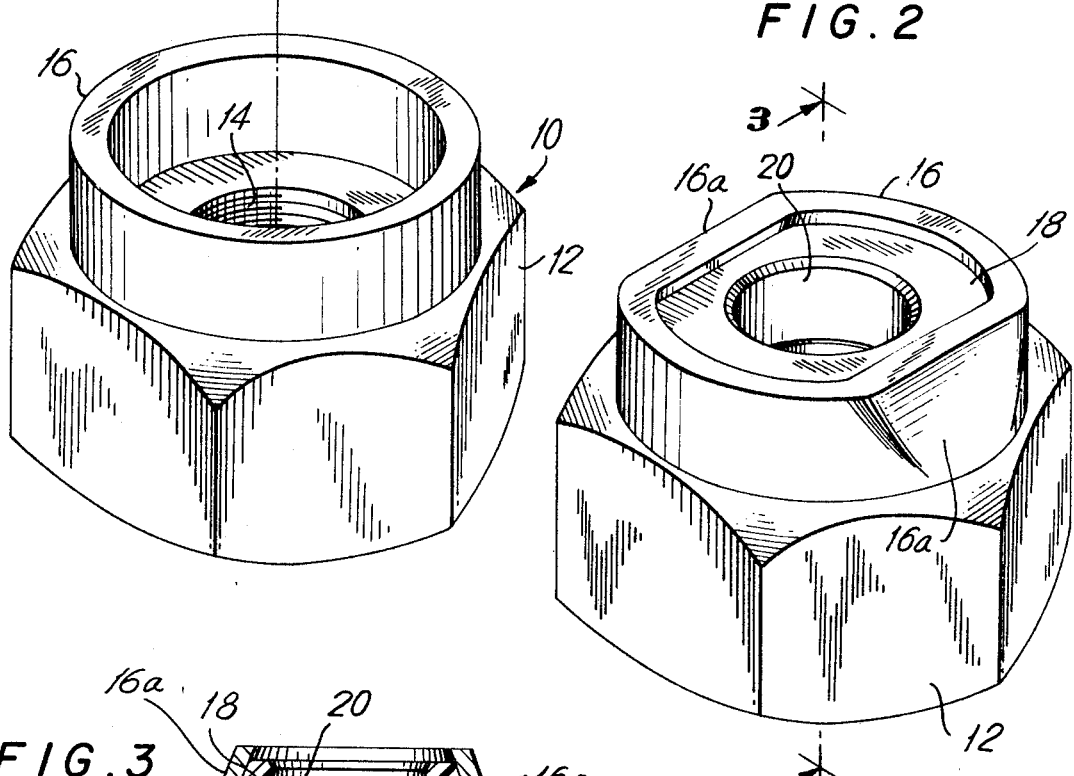
FIGURE 2 is an isometric view of the assembled lock nut formed from the elements shown in FIGURE 1.

As may be seen in FIGURE 1, the nut body 10 is provided at its periphery with wrenching surfaces 12. While hexagonal wrenching surfaces are shown, the invention is equally susceptible for use with many other conventional or special wrenching configurations, such as a square, splined, twelve-point stellate, and so on. The nut body is also provided with a threaded axial bore 14.

Projecting from the outer face of nut body 10 is a generally tubular retaining collar 16 which is formed integrally with the nut body and is coaxial with the threaded bore 14 and spaced radially outward therefrom to leave an annular recess to receive the locking bushing 18. The locking bushing 18 is of annular configuration and is formed of a hard, resilient non-metallic material, such as a synthetic thermoplastic organic polymer. The bushing 18 is provided with a central unthreaded cylindrical bore 20 which is coaxial with the threaded bore 14 in the nut body and whose diameter is approximately equal to the pitch diameter of the threaded bore 14. The outside diameter of the bushing 18 may be approximately equal to the inside diameter of the retaining collar 16 so that the bushing 18 will slip snugly into the collar 16 or may be slightly larger than the inside diameter of the retaining collar so that the bushing is pressed into the collar to create an interference fit. The thickness of the bushing 18 is preferably approximately equal to the height of the collar 16 so that when the bushing is thus inserted into the collar, with its inner face abutting the outer face of the nut body 10, the outer face of the bushing will be substantially flush with the outer edge of the collar.

The bushing 18 is provided with a pair of diametrically opposed flats or planar portions 22 which are inwardly inclined relative to the axis of the bores 14 and 20--that is, the planes of the flats are inclined so that in the direction of the outer face of the nut they are nearer the axis than they are toward the inner face of the nut. The angle of such inclination is desirably between about 10° and about 30° and preferably approximately 20°.

Figure 3:
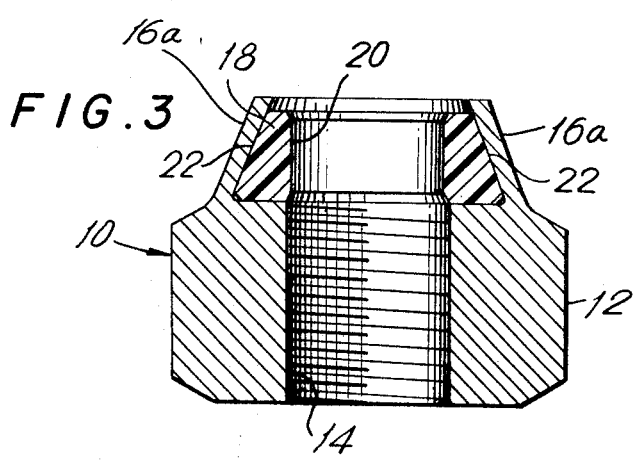
FIGURE 3 is a vertical sectional view taken on the line 3-3 of FIGURE 2.

After the bushing 18 has been inserted into the collar 16, as above described, it is secured by swaging inwardly the portions 16a of the collar opposite the flats 22 so that the inner faces of these indentations 16a substantially abut the flats 22, as best shown in FIGURE 3. In view of the slight spring back of the metal, it is preferable to overform the indentations 16a, compressing the bushing 18 within its elastic limit so that after the indentations spring back slightly upon release of the deforming pressure, the inner faces of the indentations will remain in firm or even slightly compressive engagement with the flats 22 of the bushing. Thus the bushing is securely locked against both rotational and axial movement relative to the nut body 10, to resist the substantial forces imposed upon it as a male fastener element is threaded into it. If a higher level of torque is desired, the deformation of the indentations 16a may be carried to the point where the collar is deformed, either elastically or plastically, so that its inner bore remains somewhat elliptical in shape after removal of the deforming force. More than two opposed flats 22 and indentations 16a may, of course, be employed.

Preferably, the inner face of the bushing 18 is bevelled around the edge of the bore 20 to facilitate entrance of the end of the threaded male fastener element into the bore 20. The inner wall of the bushing 18 may be coated with a lubricant, preferably a dry lubricant, to reduce friction and prevent seizing or galling of the male fastener element or stripping of plating therefrom. Preferably the resin from which the locking bushing is formed is one which has a high softening point, and also does not become excessively embrittled at low temperatures, so that the fastener may be used over a wide temperature range. The polyimide resin sold by E. I. duPont de Nemours and Co. under the trade name "Vespel SP-1" has proved particularly advantageous for this application. This material has a high yield strength and a high resistance to cutting or abrasion so that the torque required for rotation of the nut relative to the mating male fastener element remains within the desired range over a large number of applications and removals of the nut and despite subjection to a wide variety of other environmental conditions, such as high and low temperatures, water immersion, etc. Thus the nut will still provide effective resistance to loosening by vibration, etc.

Lock nuts incorporating the aforementioned "Vespel SP-1" have been successfully tested at temperatures over 500° F. Other high temperature resins, such as tetrafluorethylene and chlorotrifluoroethylene are also satisfactory for use over a wide temperature range. Polyamide (nylon) resins may also be used, although the lower softening point of such resins will restrict the temperature range within which the fasteners may be used to an upper limit of around 250° F.

The configuration of the bushing 18, being generally annular except for a limited number of relatively large flats, distributes the stress applied to the bushing and to the nut body when a male fastener element is forced into the bushing or when the final seating torque is applied to the fastener, subjecting the nut body and bushing to very large axial loadings in addition to the applied torque. This elimination of stress concentrations tends to prevent either plastic deformation or fracture of the bushing or the nut body under such stresses.

The simple configuration and uncomplicated assembly procedure also enables the manufacture of the lock nut at very modest cost.

It will therefore be apparent that the present invention provides a self-locking nut by which the aforementioned and other desirable objectives have been achieved. However, it should be emphasized that the particular embodiment of the invention which is described herein and shown in the accompanying drawings is intended as merely illustrative of the principles of the invention, and not as exhaustive or limiting thereof.

I claim:

1. A lock nut comprising a metallic body, wrenching surfaces at the periphery of said metallic body and a radially extending outer face at one end thereof, a threaded bore extending axially through said metallic body for threaded engagement with a male threaded fastener element, a generally tubular retaining collar integral with said metallic body projecting from the outer face of said metallic body concentrically with the axis of said threaded bore and spaced radially outward therefrom, an annular locking bushing of relatively hard, resilient resinous material coaxially mounted within said retaining collar with the inner face of said locking bushing lying against the outer face of said nut and the outer face of said locking bushing substantially aligned with the outer edge of said retaining collar, the generally cylindrical periphery of said locking bushing substantially contiguous with the generally cylindrical inner surface of said retaining collar and the axial bore of said locking bushing having approximately the same diameter as the pitch of said threaded bore and coaxial therewith, a pair of opposed planar surfaces at the outer periphery of said locking bushing, said planar surfaces being inwardly inclined at an angle between approximately 10° and 30° relative to said axis, the portions of said retaining collar adjacent said planar surfaces being deformed inwardly so that the inner surfaces of said portions compressively engage said planar surfaces to retain said locking bushing in position against forces tending to displace it either axially or rotationally relative to said metallic body and wherein the deformed portions of said retaining collar which compressively engage the planar surfaces of said locking bushing deform at least the outer portion of the bore of said locking bushing to a generally elliptical shape.

2. A lock nut as claimed in Claim 1, wherein said planar surfaces are at an angle of approximately 20° relative to the axis of said threaded bore.

3. A lock nut as claimed in Claim 1, in which said locking bushing is formed of a polyimide resin having a softening point in excess of 500° F.

4. A lock nut as claimed in Claim 1, in which said locking bushing is formed of a polyamide (nylon) resin.